United States Patent
Plentis et al.

(10) Patent No.: US 6,966,593 B2
(45) Date of Patent: Nov. 22, 2005

(54) VEHICLE SIDE PANEL STORAGE BOX ASSEMBLY

(75) Inventors: David Plentis, Farmington Hills, MI (US); William Bowes, Macomb, MI (US); Garry Nylander, Hartland, MI (US); William Spencer Evans, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 24 days.

(21) Appl. No.: 10/740,927

(22) Filed: Dec. 22, 2003

(65) Prior Publication Data

US 2005/0134070 A1 Jun. 23, 2005

(51) Int. Cl.⁷ .............................................. B62D 25/20
(52) U.S. Cl. ...................... 296/37.6; 296/37.1; 224/402
(58) Field of Search ............................. 296/37.6, 37.1; 224/402, 403, 404; 280/783

(56) References Cited

U.S. PATENT DOCUMENTS

| 527,339 | A | * | 10/1894 | Lins ................................ 217/7 |
| 1,717,184 | A | * | 6/1929 | Browne ....................... 280/748 |
| 2,742,317 | A | * | 4/1956 | Chandler ...................... 296/51 |
| 2,901,285 | A | * | 8/1959 | Walker ....................... 296/37.1 |
| 5,615,922 | A | | 4/1997 | Blanchard |
| 5,772,271 | A | | 6/1998 | Sanders |
| 5,823,598 | A | | 10/1998 | Clare et al. |
| 6,012,754 | A | | 1/2000 | Clare et al. |
| 6,059,141 | A | | 5/2000 | Wojnowski |
| 6,129,401 | A | | 10/2000 | Neag et al. |
| 6,439,634 | B1 | | 8/2002 | Jensen et al. |
| 6,640,569 | B2 | * | 11/2003 | Goosman ...................... 62/239 |
| 6,846,140 | B2 | | 1/2005 | Anderson et al. |

* cited by examiner

Primary Examiner—Joseph D. Pape
(74) Attorney, Agent, or Firm—Shinjyu Global IP Counselors, LLP (57) ABSTRACT

A vehicle side panel storage box assembly has a mounting structure, a compartment and a side panel door. The mounting structure is fixedly coupled to a pair of lateral cross frames of a vehicle body and has the side panel door pivotally mounted to the mounting structure. The compartment is fixedly coupled to the mounting structure mounting structure as a modular unit. The side panel door has an exterior surface panel configured and arranged to form an exterior of a vehicle body side panel.

53 Claims, 7 Drawing Sheets

VEHICLE SIDE PANEL STORAGE BOX ASSEMBLY

BACKGROUND OF THE INVENTION

1. Field of the Invention

The present invention generally relates to a vehicle side panel storage box assembly. More specifically, the present invention relates to a vehicle side panel storage box assembly mounted behind a rear wheel of a vehicle.

2. Background Information

A pickup truck is sometimes provided with an extra storage space. There are many different types of storage systems for vehicles such as pickup trucks. One of the most common storage system for a pickup trucks such is a rear box that is located in a rear bed portion of the pickup truck. More recently, integrated storage systems have been proposed. For example, U.S. Pat. No. 6,129,401 discloses a vehicle storage bin provided in a lower box side panel section behind a rear wheel of a pickup truck. The storage bin of this patent is mounted to the vehicle by a pair of brackets. The brackets are configured to allow the entire storage bin to be pulled or rotated from a closed position to an opening position in which an access opening of the storage bin is exposed. In the storage bin of this patent, the storage bin is also provided with a latch for retaining the storage bin in the closed position. This latch can be provided with an optional locking assembly for locking the storage bin in the closed position.

In view of the above, it will be apparent to those skilled in the art from this disclosure that there exists a need for an improved vehicle side panel storage box assembly. This invention addresses this need in the art as well as other needs, which will become apparent to those skilled in the art from this disclosure.

SUMMARY OF THE INVENTION

It has been discovered that with vehicle storage bins as the one mentioned above, there is not enough space for storage since the entire storage bin is arranged to rotate within the bracket to expose the access opening. Moreover, when a lock is used in this type of storage bin, the lock is exposed to adverse road conditions that can damage the lock. This is especially the case because the storage bin is located in the lower side panel of the vehicle just behind the wheel.

One of the objects of the present invention is to provide a vehicle side panel storage box assembly that provides a sufficient storage space utilizing an area behind a rear wheel of a vehicle. Another one of the objects of the present invention is to provide a vehicle side panel storage box assembly that is easily installed on the vehicle.

The forgoing objects are basically attained by providing a vehicle side panel storage box assembly comprising a mounting structure, a compartment and a side panel door. The mounting structure has a bottom support portion, a pair of side portions extending upwardly from opposite ends of the bottom support portion and a pair of mounting portions extending outwardly from the side portions. The compartment has a wall structure defining a box with an access opening. The compartment is fixedly coupled to the mounting structure between the bottom support portion and the side portions. The side panel door is movably arranged between a closed position overlying the access opening of the compartment to an opened position exposing the access opening of the compartment. The side panel door has an exterior surface panel configured and arranged to form an exterior of a vehicle body side panel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
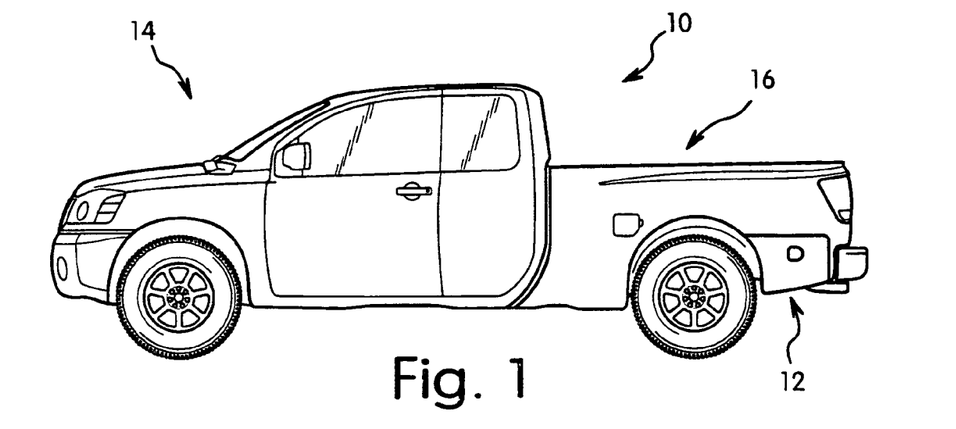
FIG. 1 is a driver's side elevational view of a vehicle having a vehicle side panel storage box assembly in accordance with a preferred embodiment of the present invention.
Figure 2:
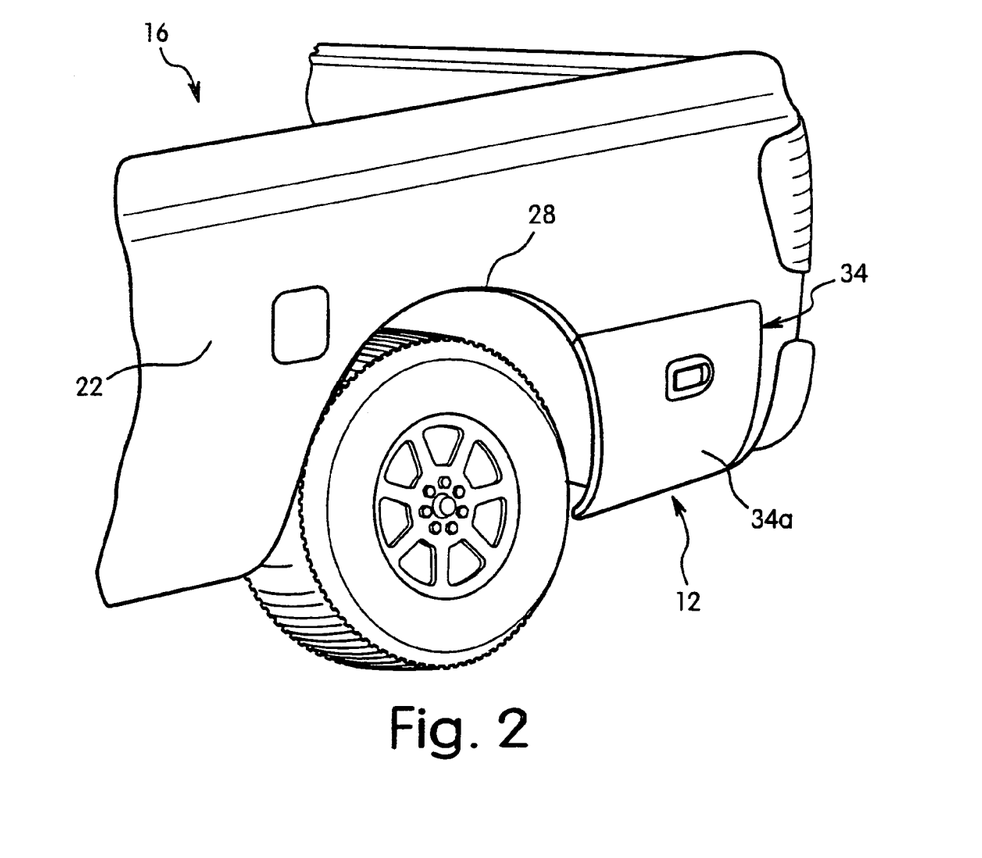
FIG. 2 is a partial side perspective view of the rear end of the vehicle illustrated in FIG. 1 with a side panel door of the vehicle side panel storage box assembly in the closed position.
Figure 3:
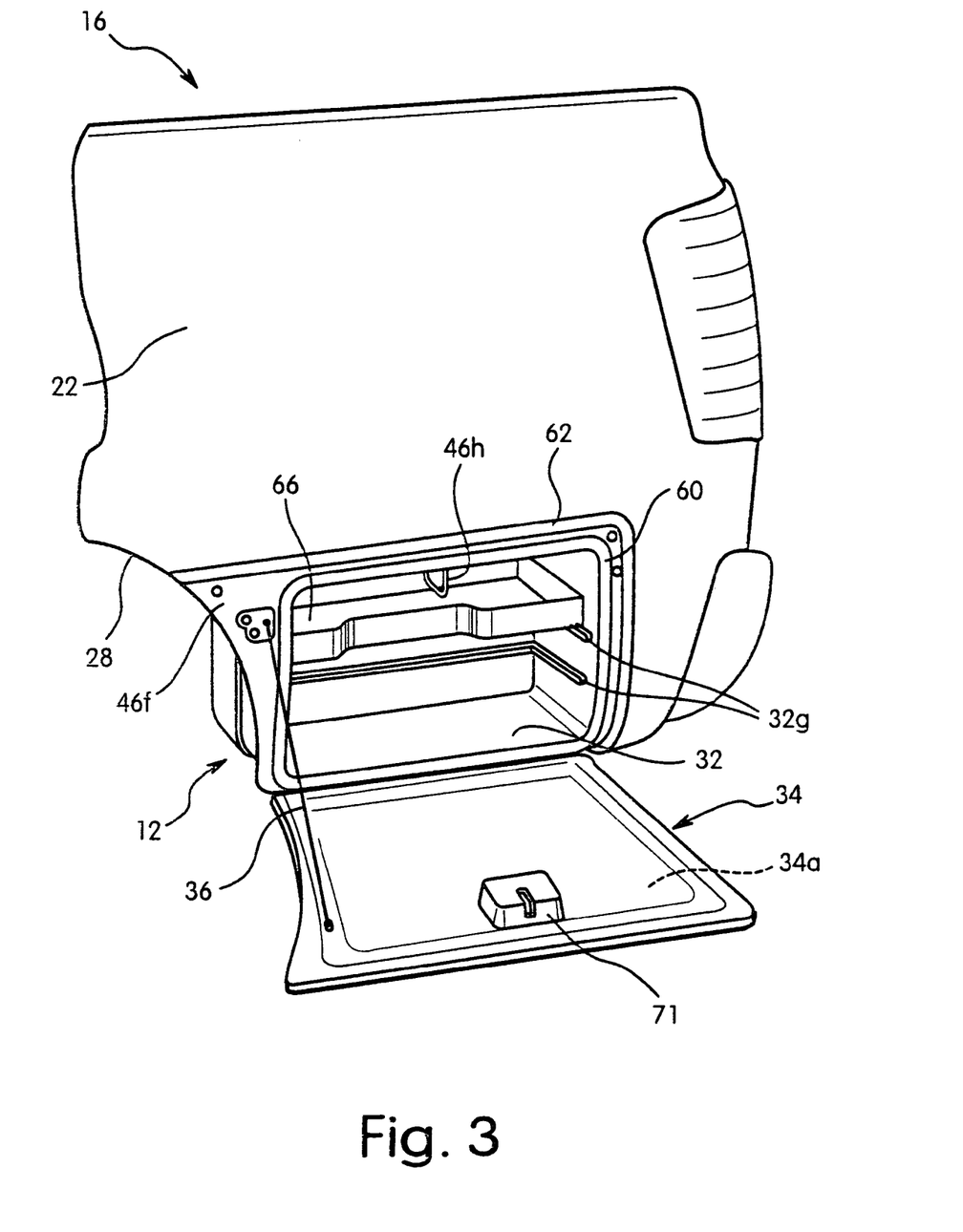
FIG. 3 is a partial side perspective view of the rear end of the vehicle illustrated in FIGS. 1 and 2 with the side panel door of the vehicle side panel storage box assembly in the open position.

Referring initially to FIGS. 1–3, a vehicle 10 is illustrated with a vehicle side panel storage box assembly 12 in accordance with a preferred embodiment of the present invention. While a pickup truck is illustrated as the vehicle 10 to explain the present invention, it will be apparent to those skilled in the art from this disclosure that the present invention can be practiced with a variety of different types of vehicles, such as, but not limited to sport utility vehicles, minivans, trucks, and alike. In the illustrated embodiment, the vehicle 10 has a forward cab portion 14 and a rear bed portion 16 that are mounted on a chassis or frame (not shown). Since the majority of the structure of the vehicle 10 is conventional and/or not important to the present invention, only those parts or portions of the vehicle 10 that relate to the present invention will be discussed or illustrated herein. In other words, the precise construction of the forward cab portion 14 and the rear bed portion 16 are not important to the present invention. Thus, simplified illustrations of the vehicle 10 will be used to describe the present invention.

Figure 4:
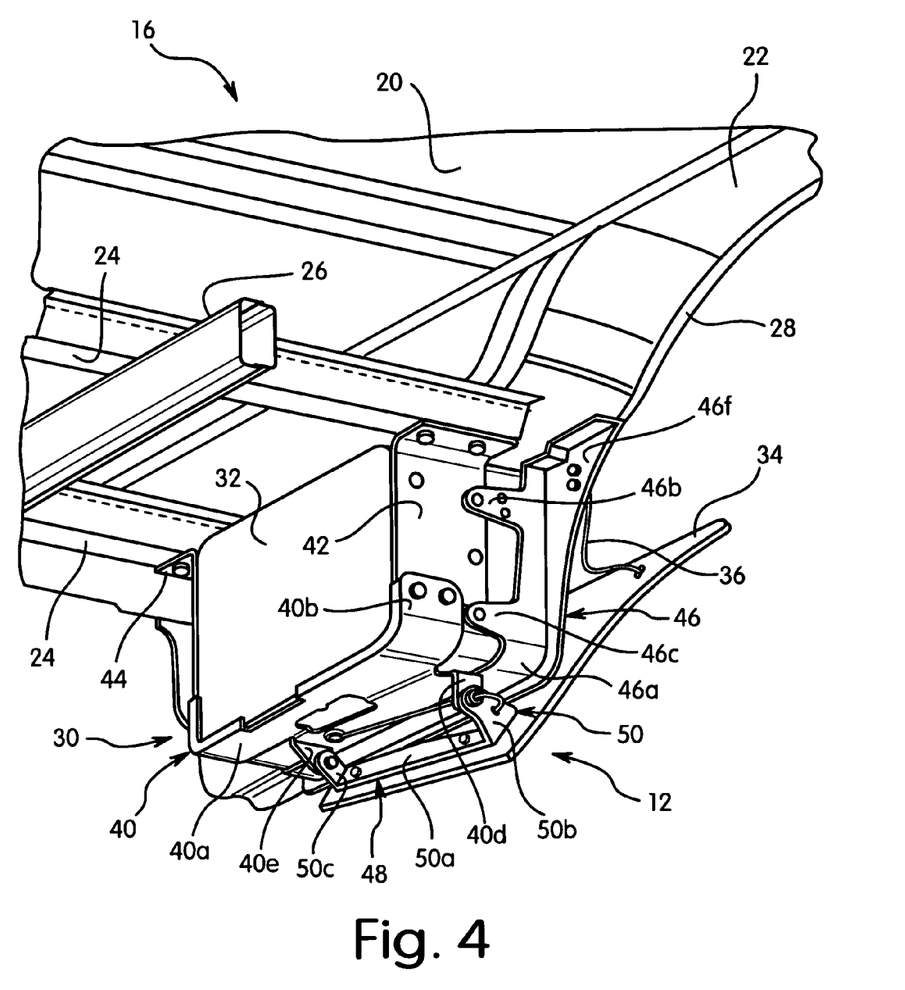
FIG. 4 is a back side perspective view of the vehicle side panel storage box assembly attached to the underside of the vehicle illustrated in FIGS. 1–3 in accordance with the preferred embodiment of the present invention.

Referring now to FIG. 4, an underside portion of the rear bed portion 16 is illustrated that forms a part of the vehicle body. The rear bed portion 16 at least includes a floor panel 20, a pair of side panels 22 (only one shown) and a plurality of lateral cross members 24 (only two shown) mounted to the bottom surface of the floor panel 20 and mounted on top of the chassis or vehicle frame 26. The floor panel 20, the side panels 22 and the lateral cross members 24 are preferably constructed of sheet materials that are bent to the desired configuration. More specifically, the floor panel 20, the side panels 22 and the lateral cross members 24 are constructed of sheet metal material and/or any other suitable materials use for making vehicle bodies.

The vehicle side panel storage box assembly 12 is mounted to a pair of adjacent lateral cross members 24 just behind a rear wheel well structure 28 of the side panel 22. This arrangement adds durability and reinforces the area of the rear bed portion 16. Preferably, the vehicle side panel storage box assembly 12 is a modular type assembly that can be easily installed as an option to the vehicle 10. The vehicle side panel storage box assembly 12 is also integrated into one of the side panels 22 (preferably the driver's side) of the vehicle body such that the vehicle side panel storage box assembly 12 blends into the exterior surface of the side panel 22. The vehicle side panel storage box assembly 12 also forms a portion of the curved wheel well opening of the wheel well structure 28 to provide an attractive appearance and to efficiently utilize the area behind the rear wheel of the vehicle 10.

Basically, the vehicle side panel storage box assembly 12 includes a mounting structure 30, a storage box or compartment 32, a side panel door 34 and a stay member 36. When the vehicle side panel storage box assembly 12 is mounted to the rear bed portion 16, the side panel door 34 forms a portion of the exterior side surface of the rear bed portion 16. More preferably, the side panel door 34 forms a portion of the curved wheel well opening of the wheel well structure 28. Accordingly, as seen in FIG. 2, the exterior surface of the side panel door 34 is substantially flush with the exterior surface of the side panel 22 and follows the contour of the vehicle 10 to provide an aesthetically pleasing appearance. In other words, the exterior surface of the side panel door 34 is configured and arranged to form an exterior portion of the vehicle body side panel 22.

Referring to FIGS. 4–7 and 9, the mounting structure 30 is preferably constructed of several pieces as illustrated. However, it will be apparent to those skilled in the art from this disclosure that some of the pieces of the mounting structures can be combined into a single piece as needed or desired. Basically, the mounting structure 30 of the illustrated embodiment includes a bottom bracket 40, a front side bracket 42, a rear side bracket 44, a side panel bracket 46 and a hinge assembly 48. Preferably, these pieces are constructed of rigid metal materials that form a support structure for the storage box or compartment 32. Moreover, the side panel door 34 is hingedly mounted to the mounting structure 30 via the hinge assembly 48. This arrangement assures that the side panel door 34 is securely fastened to the vehicle body and provides an integrated structure.

Figure 9:
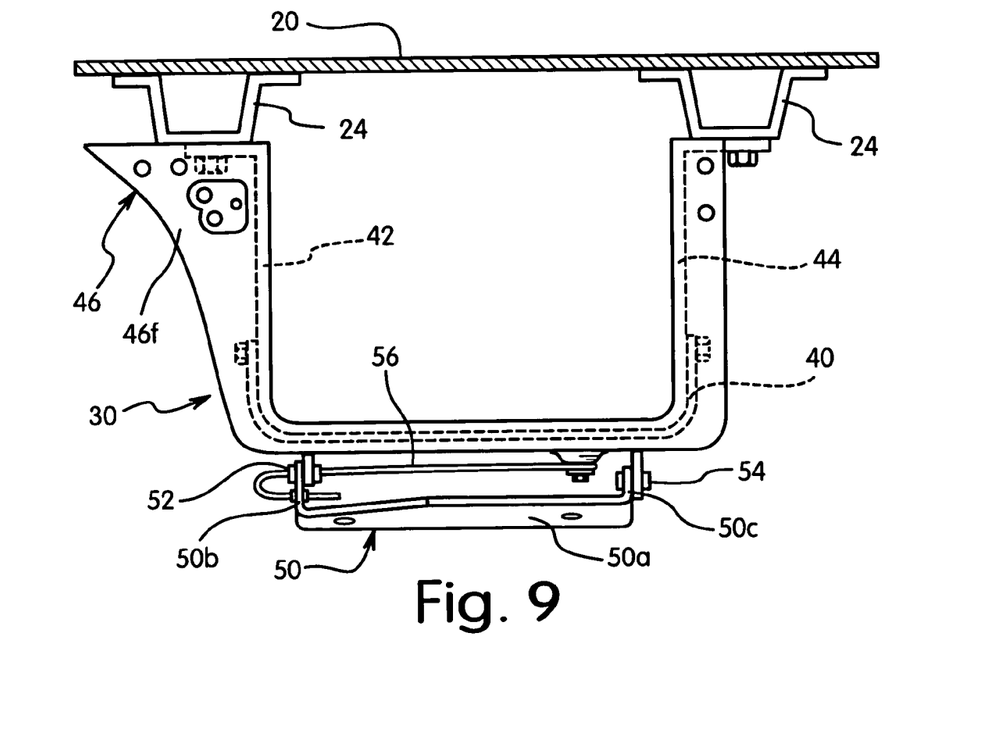
FIG. 9 is an exterior side elevational view of the mounting structure of the vehicle side panel storage box assembly with the storage box or compartment removed for purposes of illustration.

The bottom bracket 40 is preferably a metal bracket having a generally U-shaped configuration. In particular, the bottom bracket 40 has a central support portion 40a, a front side mounting portion 40b, a rear side mounting portion 40c and a pair of hinge tabs 40d and 40e. The central support portion 40a provides support to the bottom of the compartment 32 while the front and rear side mounting portions 40b and 40c are secured to the front and rear side brackets 42 and 44 via a plurality of fasteners. The hinge assembly 48 is fixedly coupled to the bottom bracket 40 by the hinge tabs 40d and 40e. Thus, the side panel door 34 is pivotally mounted to the bottom bracket 40 for pivoting about a horizontal pivot axis that generally extends in the front to aft direction of the vehicle 10.

The front side bracket 42 is preferably an inverted L-shape bracket constructed of a rigid metallic material that has the upper end fixedly coupled to one of the lateral cross members 24 of the vehicle body. The lower end of the front side bracket 42 is fixedly coupled to the front side mounting portion 40b of the bottom bracket 40 by a plurality of fasteners. Also, the side panel bracket 46 is also preferably coupled along the outside edge of the front side bracket 42 such that the side panel bracket 46 is rigidly retained relative to the vehicle body.

Figure 6:
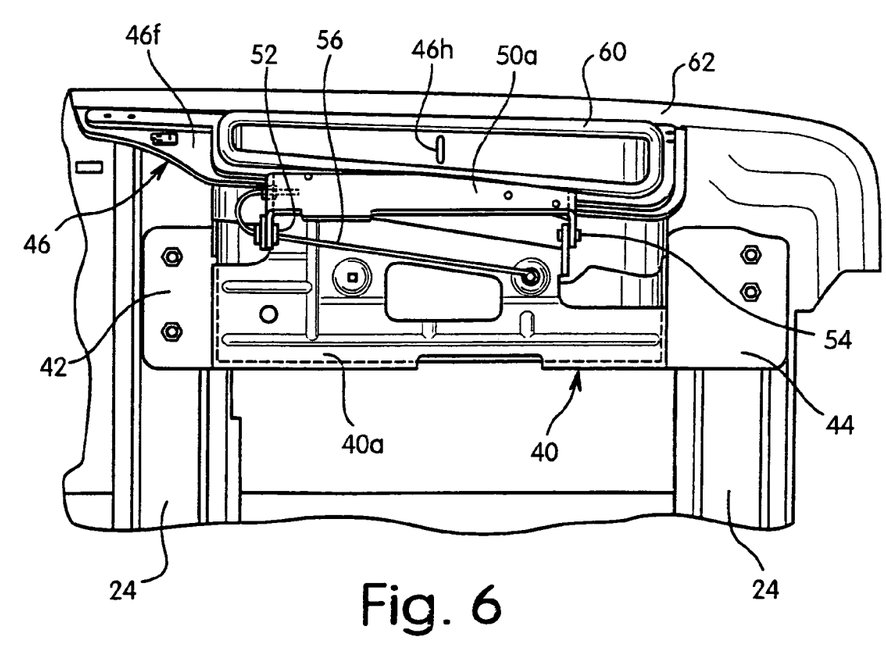
FIG. 6 is a bottom plan of the vehicle side panel storage box assembly attached to the underside of the vehicle illustrated in FIGS. 1–5 with the side panel door removed for purposes of illustration.

Referring to FIGS. 4, 6 and 9, the rear side bracket 44 is substantially the mirror image of the front side bracket 42. Thus, the rear side bracket 44 is preferably an inverted L-shaped member that is constructed of a rigid metallic material. The upper end of the rear side bracket 44 is fixedly coupled to one of the lateral cross members 24. In particular, the front and rear side brackets 42 and 44 are coupled to a pair of adjacent lateral cross members 24 such that they are rigidly connected together at the lateral ends by the mounting structure 30. Accordingly, rigidity of the rear bed portion 16 is increased by use of the mounting structure 30. The lower end of the rear side bracket 44 is fixedly coupled to the rear side mounting portion 40c of the bottom bracket 40 by a plurality of fasteners. Also, the side panel bracket 46 is fixedly coupled to the outside edge of the rear side bracket 44. The side panel bracket 46 is preferably a substantially U-shaped member that is fixedly coupled to the front and rear side brackets 42 and 44 as well as to the side panel 22 of the rear bed portion 16. Accordingly, the mounting structure 30 also has rigidity to the side panel 22. In particular, the side panel bracket 46 has a main U-shaped body portion 46a with four mounting tabs 46b, 46c, 46d and 46e that are fixedly coupled to the front and rear side brackets 42 and 44. Also, the side panel bracket 46 has a front side mounting flange 46f and a rear side mounting flange 46g that are coupled to the side panel 22. The front side mounting flange 46f also has one end of the stay member 36 coupled thereto.

As seen in FIG. 3, the side panel bracket 46 also includes a hook latch 46h that extends into the compartment 32. The hook latch 46h is generally a U-shaped bar that extends through the top wall portion 32d of the compartment 32. The hook latch 46h is configured and arranged to secure the side panel door 34 to the compartment 32 as discussed below.

Figure 5:
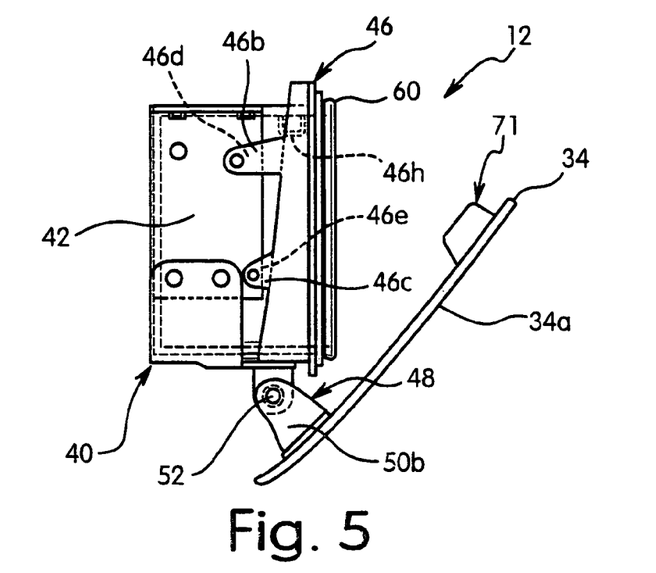
FIG. 5 is a front end elevational view of the vehicle side panel storage box assembly with side panel door pivoted to an open position for purposes of illustration.

Referring to FIGS. 4–6, the hinge assembly 48 basically includes a mounting bracket 50, a pair of pivot pins 52 and 54 and a torsion bar 56. The mounting bracket 50 is preferably a U-shaped member having a central door mounting section 50a and a pair of hinge flanges 50b and 50c that extend from opposite end of the door mounting section 50a. The hinge flanges 50b and 50c are pivotally coupled to the hinge tabs 40d and 40e of the bottom bracket 40 by the pivot pins 52 and 54. The pivot pins 52 and 54 form a lower horizontally arranged pivot axis configured and arranged to pivot to the side panel door 34 downwardly relative to the compartment 32 when the side panel door 34 is moved from a closed position to an opened position. Downward pivotal movement of the side panel door 34 is limited by the stay member 36 that is coupled between the front side mounting flange 46f of the side panel bracket 46 and the inside surface of the side panel door 34.

Still referring to FIGS. 4–6, the torsion bar 56 is preferably a metal bar that has a first end secured to the central support portion 40a of the mounting structure 30 and a second end coupled to the front hinge flange 50b of the mounting bracket 50. In particular, the rearward or first end of the torsion bar 56 has a looped portion in which a fastener is inserted that is threaded into a threaded bore in the bottom bracket 40. The second or forward end of the torsion bar 56 is preferably a hook-shaped portion that passes through the pivot pin 52 and it is inserted into a hole formed in the hinge flange 50b.

Figure 10:
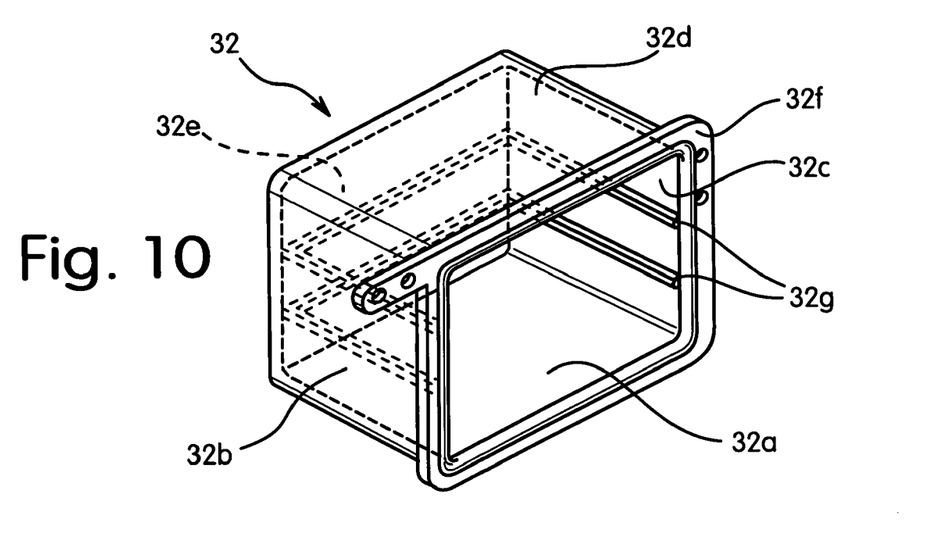
FIG. 10 is an exterior side perspective view of the storage box or compartment removed from the mounting structure of the vehicle side panel storage box assembly for purposes of illustration.

The storage box or compartment 32 is preferably constructed as a one piece, unitary member from a hard rigid non-metallic material such as a rigid plastic material. The compartment 32 is secured to the front and rear side brackets 42 and 44 utilizing conventional fasteners. Moreover, the compartment 32 is also preferably coupled to the side panel bracket 46 and the side panels 22 to securely fasten the compartment 32 to the vehicle body. Basically, the compartment 32 has a bottom wall portion 32a, a pair of side wall portions 32b and 32c, a top wall portion 32d and a rear wall portion 32e. Thus, the various wall portions 32a–32e form a wall structure that defines a box with a side access opening. The side access opening of the compartment 32 is selectively covered by the side panel door 34. Preferably, the wall structure formed by wall portions 32a–32e has a mounting flange 32f that extends outwardly and substantially perpendicularly from the side wall portions 32b and 32c and the top wall portion 32d. Preferably, the mounting flange 32f has a plurality of holes for mounting to the side panel bracket 46 and the side panel 22 by a conventional fastener.

Figure 7:
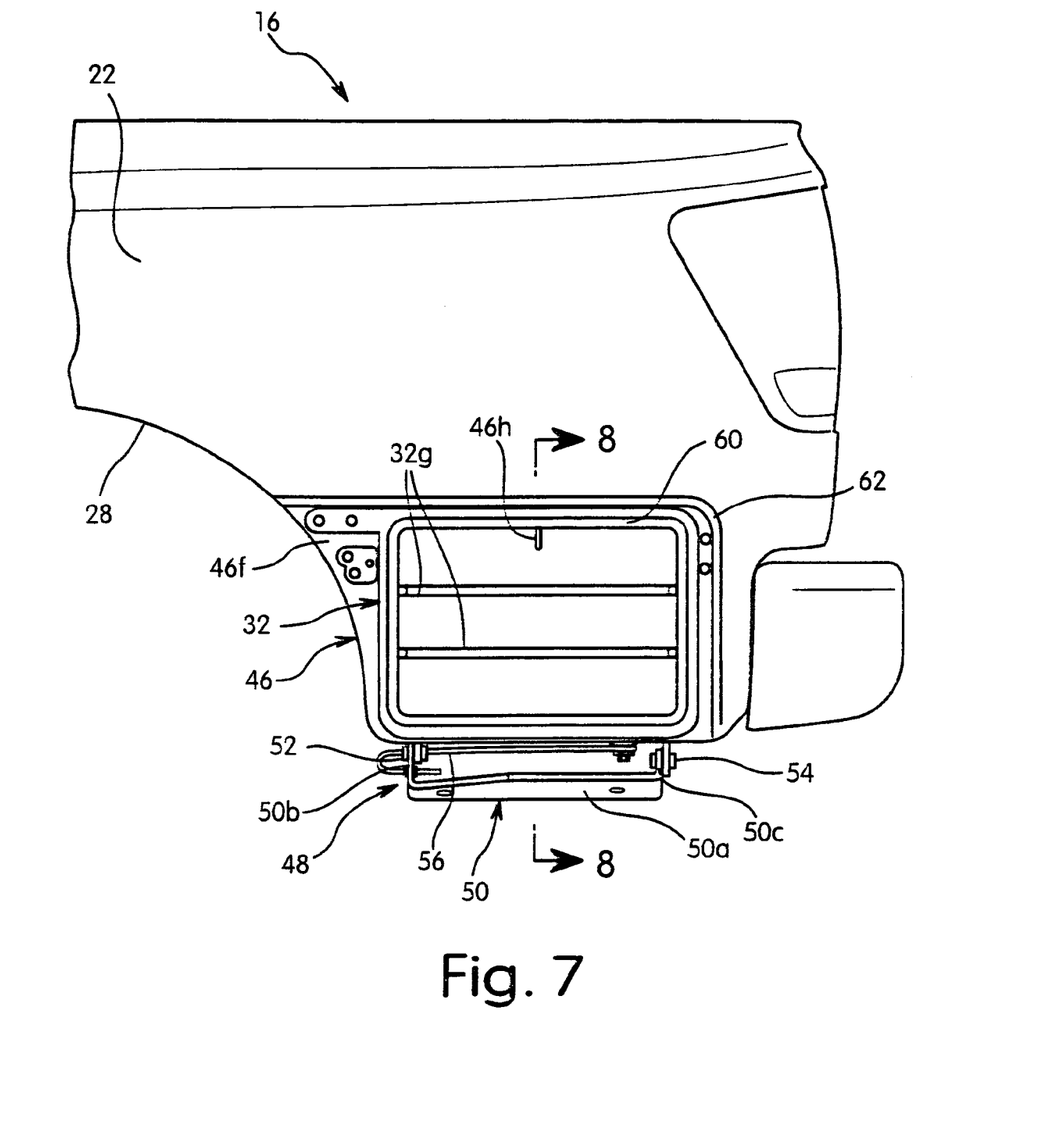
FIG. 7 is an exterior side elevational view of the vehicle side panel storage box assembly attached to the underside of the vehicle illustrated in FIGS. 1–6 with the side panel door removed for purposes of illustration.
Figure 8:
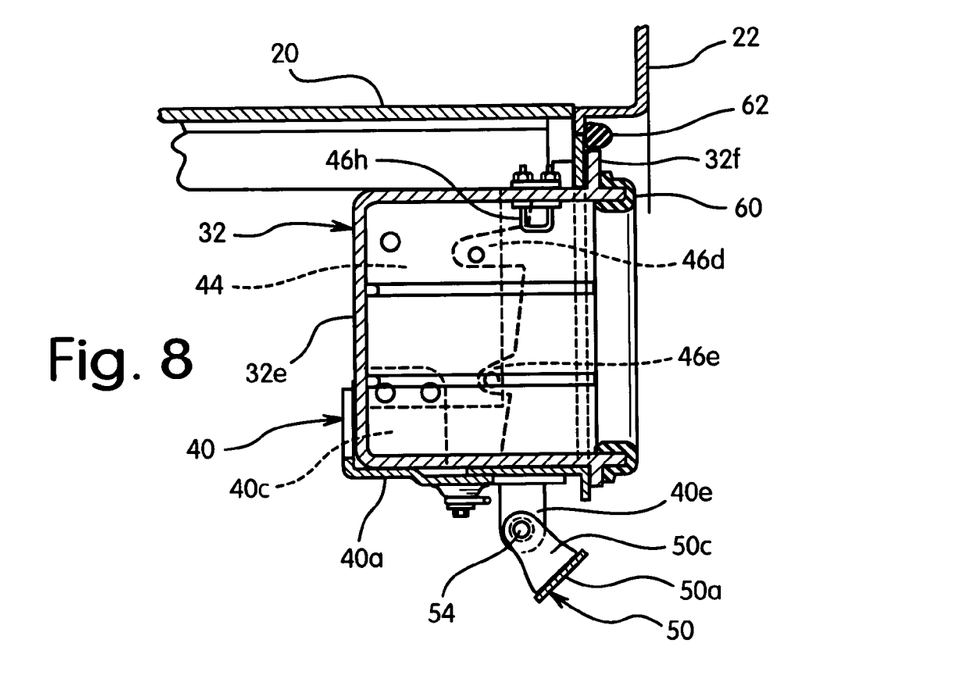
FIG. 8 is a transverse cross sectional view of the vehicle side panel storage box assembly as seen along section line 8—8 of FIG. 7 with the side panel door removed for purposes of illustration.

Referring to FIGS. 3, 7 and 8, preferably, an annular gasket 60 is attached to the edges of the wall portions 32a–32e to form a seal between the outer edges of the wall portions 32a–32e and the side panel door 34 when the side panel door 34 is in the closed position. The gasket 60 or seal is formed of electrometric material or other materials having good weather proofing characteristics. In particular, the gasket 60 is configured and arranged so that when the side panel door 34 is in the close position, the gasket 60 is compressed to form a weather-tight seal. When the side panel door 34 is pivoted to the open position, the gasket 60 will spring back to the original form (uncompressed state) due to the resiliency of the material of the gasket 60. The mounting flange 32f of the compartment 32 is preferably recessed inwardly towards the center of the vehicle body relative to the gasket 60 to ensure a good seal.

Moreover, an additional gasket 62 is preferably formed along the top and rear edges of the compartment 32. In particular, the additional gasket 62 is spaced outwardly relative to the gasket 60 such that the additional gasket 62 forms an additional outer seal along two of the edges of the compartment 32. In other words, when the side panel door 34 is in the closed position, the additional gasket 62 is compressed between the side panel door 32 and the side panel 22 to form a weather-tight seal therebetween. Preferably, the gasket 62 is constructed of the same material as the gasket 60 or a similar material to the gasket 60.

Referring to FIGS. 3 and 7, preferably, the compartment 32 has a plurality of ribs 32g that extend along the side wall portions 32b and 32c and the rear wall portion 32e. The ribs 32g form tray support ledges for receiving one or more optional trays or shelves 66. The tray 66 is dimensioned to rest on one of the ribs 32g so that additional accessories can be stored on the shelf above the bottom wall portion 32a. Since the tray 66 merely rests on the ribs 32g, the tray 66 can be easily removed as need and/or desired.

The side panel door 34 is preferably constructed as a rigid member from metallic sheet materials, and has a substantially rectangular configuration. An exterior surface panel 34a of the side panel door 34 has a smooth exterior surface configuration that defines a portion of the exterior surface of the side panel 22 of the vehicle body. In particular, the exterior surface panel 34a of the side panel door 34 has a curved front edge, a substantially straight upper edge, a substantially straight rear edge and a substantially straight lower edge. Preferably, the upper and lower edges of the exterior surface panel 34a of the side panel door 34 extend substantially horizontally with the front and rear edges extending between the upper and lower edges. The front edge of the exterior surface panel of the side door panel 34 has a concaved arch shape that defines a portion of the side body wheel well opening. Thus, the exterior surface panel 34a is contoured to form a flushed surface with the remainder of the side panel 22 and is contoured so as to blend in the remaining configuration of the side panel 22. In other words, the side panel 22 with the vehicle side panel storage box assembly 12 has substantially the same look as the other side panel 22 that does not include a vehicle side panel storage box assembly 12.

Of course, it will be apparent to those skilled in the art from this disclosure that the vehicle side panel storage box assembly 12 can be attached to each of the side panels 22 as needed or desired.

Referring again to FIGS. 3 and 11–12, the side panel door 34 preferably has a locking unit 70 attached to the interior surface of the side panel door 34. The locking unit 70 is configured and arranged to releasably grasp the hook latch 46h to secure the side panel door 34 to the compartment 32. The locking unit 70 includes a key operated latching mechanism 71 with a lock cylinder 72 that is accessible through the exterior surface panel 34a of the side panel door 34 as seen in FIGS. 11 and 12.

Figure 11:
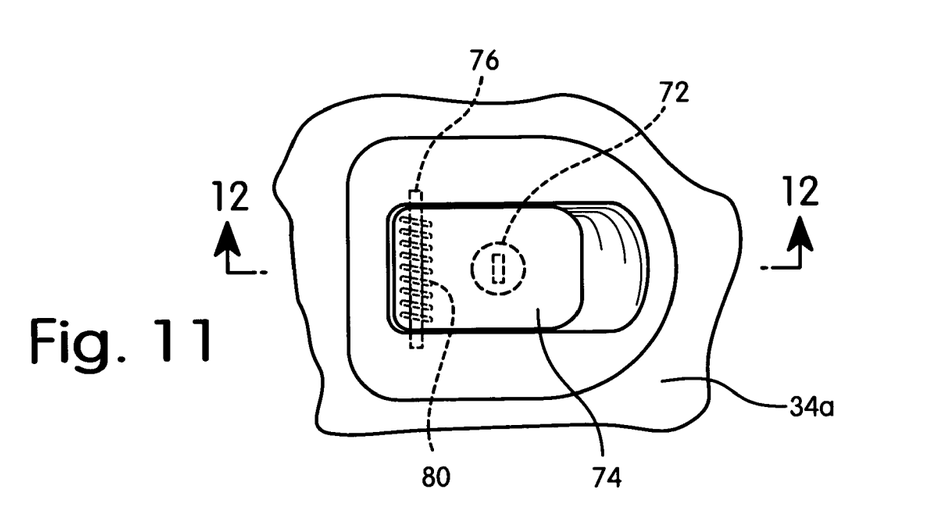
FIG. 11 is an enlarged partial exterior side elevational view of the side panel door of the vehicle side panel storage box assembly in an area of a locking unit.
Figure 12:
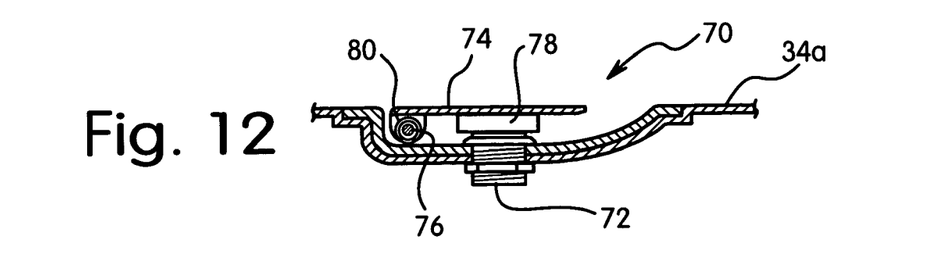
FIG. 12 is a partial cross sectional of the side panel door in the area of the locking unit as seen along section line 12—12 of FIG. 11.

Referring to FIGS. 2, 11 and 12, preferably, the exterior surface panel 34a is provided with a lock cylinder cover 74 that is pivotally coupled to the side panel door 34 by a pivot pin 76. The lock cylinder cover 74 preferably includes a sealing member or gasket 78 constructed of a resilient sealing material such as a rubber or form pad. The lock cylinder cover 74 is preferably biased to a close position by a torsion spring 80 that urges the sealing member 78 against the exterior face of the lock cylinder 72 to protect the lock cylinder 72 from contaminates. In other words, the lock cylinder cover 74 has the sealing member 74 configured and arranged to protect the lock cylinder 72 from contaminates when the lock cylinder cover 74 is in its normal closed position. Of course, to access the lock cylinder 72, the user merely pivots the lock cylinder cover 74 against the urging force of the biasing member 80 such that the lock cylinder cover 74 pivots about the pivot pin 76 and exposes the lock cylinder 72.

The locking unit 70 is a conventional component that is well known in the art. For example, the lock unit 70 can be constructed in a manner that is similar to the lock units that are often used in glove compartments of vehicles. Thus, the lock unit 70 will not be discussed or illustrated in detail herein.

The stay member 36 is preferably a flexible cable having a first end fixedly coupled to the front side mounting flange 46f of the side panel bracket 46 in the area between the wheel wells of the side panel 22 and the forwardly facing side wall portion 32b of the compartment 32. A second end of the stay member 36 is fixedly coupled to the inner wall of the side panel door 34. Thus, the stay member 36 limits the downward pivotal movement of the side panel door 34 relative to the compartment 32.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. Also the terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle side panel storage box assembly comprising:
a mounting structure having a bottom support portion, a pair of side portions extending upwardly from opposite ends of the bottom support portion and a pair of mounting portions extending outwardly from the side portions;
a compartment having a wall structure defining a box with an access opening, the compartment being fixedly coupled to the mounting structure between the bottom support portion and the side portions; and
a side panel door movably arranged between a closed position overlying the access opening of the compartment to an open position exposing the access opening of the compartment, the side panel door having an exterior surface panel configured and arranged to form an exterior of a vehicle body side panel,
the side panel door being pivotally coupled to the mounting structure by a hinge assembly that has a first part on the mounting structure and a second part on the side panel door.

2. The vehicle side panel storage box assembly according to claim 1, wherein
the hinge assembly has a lower horizontally arranged pivot axis configured and arranged to pivot the side panel door downwardly relative to the compartment when moved from the closed position to the opened position.

3. The vehicle side panel storage box assembly according to claim 2, further comprising
a stay member having a first end coupled to the mounting structure and a second end coupled to the side panel door, the stay member being located outside of the compartment and configured to limit downward movement of the side panel door.

4. The vehicle side panel storage box assembly according to claim 1, wherein
the compartment is primarily constructed of a non-metallic material and the mounting structure is primarily constructed of a rigid metallic material.

5. The vehicle side panel storage box assembly according claim 1, wherein
the exterior surface panel of the side panel door has a front edge, an upper edge, a rear edge and a lower edge with the upper and lower edges extending substantially horizontally and the front and rear edges extending between the upper and lower edges.

6. The vehicle side panel storage box assembly according to claim 5, further comprising
a stay member having a first end coupled to the mounting structure and a second end coupled to the side panel door, the stay member being located outside of the compartment and configured to limit downward movement of the side panel door.

7. A vehicle side panel storage box assembly comprising:
a mounting structure having a bottom support portion, a pair of side portions extending upwardly from opposite ends of the bottom support portion and a pair of mounting portions extending outwardly from the side portions;
a compartment having a wall structure defining a box with an access opening, the compartment being fixedly coupled to the mounting structure between the bottom support portion and the side portions;
a side panel door movably arranged between a closed position overlying the access opening of the compartment to an open position exposing the access opening of the compartment, the side panel door having an exterior surface panel configured and arranged to form an exterior of a vehicle body side panel; and
a stay member having a first end coupled to the mounting structure and a second end coupled to the side panel door, the stay member being located outside of the compartment and configured to limit downward movement of the side panel door, the stay member being completely covered by the side panel door when the side panel door is in the closed position.

8. A vehicle side panel storage box assembly comprising:
a mounting structure having a bottom support portion, a pair of side portions extending upwardly from opposite ends of the bottom support portion and a pair of mounting portions extending outwardly from the side portions;

a compartment having a wall structure defining a box with an access opening, the compartment being fixedly coupled to the mounting structure between the bottom support portion and the side portions; and a side panel door movably arranged between a closed position overlying the access opening of the compartment to an open position exposing the access opening of the compartment, the side panel door having an exterior surface panel configured and arranged to form an exterior of a vehicle body side panel, the exterior surface panel of the side panel door having a front edge, an upper edge, a rear edge and a lower edge with the upper and lower edges extending substantially horizontally and the front and rear edges extending between the upper and lower edges, the front edge having a concaved arc shape that defines a portion of a side body wheel opening.

9. The vehicle side panel storage box assembly according to claim 8, further comprising a stay member having a first end coupled to the mounting structure and a second end coupled to the side panel door, the stay member being located outside of the compartment and configured to limit downward movement of the side panel door.

10. A vehicle side panel storage box assembly comprising:

a mounting structure having a bottom support portion, a pair of side portions extending upwardly from opposite ends of the bottom support portion and a pair of mounting portions extending outwardly from the side portions;

a compartment having a wall structure defining a box with an access opening, the compartment being fixedly coupled to the mounting structure between the bottom support portion and the side portions; and a side panel door movably arranged between a closed position overlying the access opening of the compartment to an open position exposing the access opening of the compartment, the side panel door having an exterior surface panel configured and arranged to form an exterior of a vehicle body side panel, the side panel door including a latching member and the compartment including a latch member that is arranged to cooperate with the latching member of the side panel door to retain the side panel door in the closed position.

11. The vehicle side panel storage box assembly according to claim 10, wherein the latching member includes a lock cylinder and a lock cylinder cover.

12. The vehicle side panel storage box assembly according to claim 11, wherein the lock cylinder cover is arranged to pivot relative to the side panel door between a covering position overlying the lock cylinder and an uncovered position exposing the lock cylinder.

13. The vehicle side panel storage box assembly according to claim 12, wherein the lock cylinder cover is biased to the covering position by a biasing element.

14. The vehicle side panel storage box assembly according to claim 13, wherein the lock cylinder cover includes a sealing member that is configured and arranged to protect the lock cylinder from contaminates.

15. A vehicle side panel storage box assembly comprising:

a mounting structure having a bottom support portion, a pair of side portions extending upwardly from opposite ends of the bottom support portion and a pair of mounting portions extending outwardly from the side portions;

a compartment having a wall structure defining a box with an access opening, the compartment being a separate component from the mounting structure that is fixedly coupled to the mounting structure between the bottom support portion and the side portions; and a side panel door pivotally mounted directly on the mounting structure between a closed position overlying the access opening of the compartment to an opened position exposing the access opening of the compartment.

16. The vehicle side panel storage box assembly according to claim 15, wherein the side panel door is pivotally coupled to the mounting structure by a hinge assembly that is mounted between the mounting structure and the side panel door.

17. The vehicle side panel storage box assembly according to claim 16, wherein the hinge assembly has a lower horizontally arranged pivot axis configured and arranged to pivot the side panel door downwardly relative to the compartment when moved from the closed position to the opened position.

18. The vehicle side panel storage box assembly according to claim 17, further comprising a stay member having a first end coupled to the mounting structure and a second end coupled to the side panel door, the stay member being located outside of the compartment and configured to limit downward movement of the side panel door.

19. The vehicle side panel storage box assembly according to claim 15, wherein the compartment is primarily constructed of a non-metallic material and the mounting structure is primarily constructed of a rigid metallic material.

20. The vehicle side panel storage box assembly according to claim 15, wherein the side panel door has an exterior surface panel with a front edge, an upper edge, a rear edge and a lower edge with the upper and lower edges extending substantially horizontally and the front and rear edges extending between the upper and lower edges.

21. The vehicle side panel storage box assembly according to claim 20, further comprising a stay member having a first end coupled to the mounting structure and a second end coupled to the side panel door, the stay member being located outside of the compartment and configured to limit downward movement of the side panel door.

22. The vehicle side panel storage box assembly according to claim 20, wherein the front edge has a concaved arc shape that defines a portion of a side body wheel opening.

23. A vehicle side panel storage box assembly comprising:

a mounting structure having a bottom support portion, a pair of side portions extending upwardly from opposite ends of the bottom support portion and a pair of mounting portions extending outwardly from the side portions;

a compartment having a wall structure defining a box with an access opening, the compartment being fixedly coupled to the mounting structure between the bottom support portion and the side portions;

a side panel door pivotally mounted to the mounting structure between a closed position overlying the access opening of the compartment to an opened position exposing the access opening of the compartment; and a stay member having a first end coupled to the mounting structure and a second end coupled to the side panel door, the stay member being located outside of the compartment and configured to limit downward movement of the side panel door, the stay member being completely covered by the side panel door when the side panel door is in the closed position.

24. A vehicle side panel storage box assembly comprising:

a mounting structure having a bottom support portion, a pair of side portions extending upwardly from opposite ends of the bottom support portion and a pair of mounting portions extending outwardly from the side portions;

a compartment having a wall structure defining a box with an access opening, the compartment being fixedly coupled to the mounting structure between the bottom support portion and the side portions; and a side panel door pivotally mounted to the mounting structure between a closed position overlying the access opening of the compartment to an opened position exposing the access opening of the compartment, the side panel door has an exterior surface panel including a first side edge having a concaved arc shape that defines a portion of a side body wheel opening.

25. A vehicle side panel storage box assembly comprising:

a mounting structure having a bottom support portion, a pair of side portions extending upwardly from opposite ends of the bottom support portion and a pair of mounting portions extending outwardly from the side portions;

a compartment having a wall structure defining a box with an access opening, the compartment being fixedly coupled to the mounting structure between the bottom support portion and the side portions; and a side panel door pivotally mounted to the mounting structure between a closed position overlying the access opening of the compartment to an opened position exposing the access opening of the compartment, the side panel door including a latching member and the compartment including a latch member that is arranged to cooperate with the latching member of the side panel door to retain the side panel door in the closed position.

26. The vehicle side panel storage box assembly according to claim 25, wherein
the latching member includes a lock cylinder and a lock cylinder cover.

27. The vehicle side panel storage box assembly according to claim 26, wherein
the lock cylinder cover is arranged to pivot relative to the side panel door between a covering position overlying the lock cylinder and an uncovered position exposing the lock cylinder.

28. The vehicle side panel storage box assembly according to claim 27, wherein
the lock cylinder cover is biased to the covering position by a biasing element.

29. The vehicle side panel storage box assembly according to claim 28, wherein
the lock cylinder cover includes a sealing member that is configured and arranged to protect the lock cylinder from contaminates.

30. A vehicle structure comprising:

a vehicle body having a side panel defining a first portion of a side body wheel opening; and a vehicle side panel storage box assembly coupled to the vehicle body, the vehicle side panel storage box assembly including a mounting structure having a bottom support portion, a pair of side portions extending upwardly from opposite ends of the bottom support portion and a pair of mounting portions extending outwardly from the side portions, the mounting portions being coupled to the vehicle body;

a compartment having a wall structure defining a box with an access opening, the compartment being fixedly coupled to the mounting structure between the bottom support portion and the side portions; and a side panel door movably arranged between a closed position overlying the access opening of the compartment to an opened position exposing the access opening of the compartment, the side panel door having an exterior surface panel that follows an exterior contour of the side panel, the side panel door including a first side edge that defines a second portion of a side body wheel opening.

31. The vehicle structure according to claim 30, wherein
the side panel door is pivotally coupled to the mounting structure by a hinge assembly that is mounted directly on the mounting structure and the side panel door.

32. The vehicle structure according to claim 31, wherein
the hinge assembly has a lower horizontally arranged pivot axis configured and arranged to pivot the side panel door downwardly relative to the compartment when moved from the closed position to the opened position.

33. The vehicle structure according to claim 32, further comprising
a stay member having a first end coupled to the mounting structure and a second end coupled to the side panel door, the stay member being located outside of the compartment and configured to limit downward movement of the side panel door.

34. The vehicle structure according to claim 30, wherein
the compartment is primarily constructed of a non-metallic material and the mounting structure is primarily constructed of a rigid metallic material.

35. The vehicle structure according to claim 30, wherein
the exterior surface panel of the side panel door further includes an upper edge, a lower edge and a second side edge with the upper and lower edges extending substantially horizontally and the first and second side edges extending between the upper and lower edges.

36. The vehicle structure according to claim 35, further comprising
a stay member having a first end coupled to the mounting structure and a second end coupled to the side panel door, the stay member being located outside of the compartment and configured to limit downward movement of the side panel door.

37. The vehicle structure according to claim 30, wherein
the first side edge has a concaved arc shape that defines the second portion of the side body wheel opening.

38. The vehicle structure according to claim 35, wherein the first edge has a concaved arc shape that defines the second portion of the side body wheel opening.

39. The vehicle structure according to claim 30, wherein the side panel door includes a latching member and the compartment includes a latch member that is arranged to cooperate with the latching member of the side panel door to retain the side panel door in the closed position.

40. The vehicle structure according to claim 39, wherein the latching member includes a lock cylinder and a lock cylinder cover.

41. The vehicle structure according to claim 40, wherein the lock cylinder cover is arranged to pivot relative to the side panel door between a covering position overlying the lock cylinder and an uncovered position exposing the lock cylinder.

42. The vehicle structure according to claim 41, wherein the lock cylinder cover is biased to the covering position by a biasing element.

43. The vehicle structure according to claim 39, wherein the lock cylinder cover includes a sealing member that is configured and arranged to protect the lock cylinder from contaminates.

44. A vehicle structure comprising:
a vehicle body having a side panel; and
a vehicle side panel storage box assembly coupled to the vehicle body, the vehicle side panel storage box assembly including
a mounting structure fixedly coupled to the vehicle body,
a mounting structure having a bottom support portion, a pair of side portions extending upwardly from opposite ends of the bottom support portion and a pair of mounting portions extending outwardly from the side portions, the mounting portions being coupled to the vehicle body;
a compartment having a wall structure defining a box with an access opening, the compartment being fixedly coupled to the mounting structure between the bottom support portion and the side portions;
a side panel door movably arranged between a closed position overlying the access opening of the compartment to an opened position exposing the access opening of the compartment, the side panel door having an exterior surface panel that follows an exterior contour of the side panel; and
a stay member having a first end coupled to the mounting structure and a second end coupled to the side panel door, the stay member being located outside of the compartment and configured to limit downward movement of the side panel door, the stay member being completely covered by the side panel door when the side panel door is in the closed position.

45. A vehicle structure comprising:
a vehicle body having a side panel; and
a vehicle side panel storage box assembly coupled to the vehicle body, the vehicle side panel storage box assembly including
a mounting structure fixedly coupled to the vehicle body,
a compartment having a wall structure defining a box with an access opening, the compartment being fixedly coupled to the mounting structure, and
a side panel door pivotally mounted directly on the mounting structure such that the side panel door is primarily supported by the mounting structure to move between a closed position overlying the access opening of the compartment to an opened position exposing the access opening of the compartment.

46. The vehicle structure according to claim 45, wherein the side panel door is configured and arranged relative to the mounting structure to pivot downwardly about a lower horizontally arranged pivot axis relative to the compartment when moved from the closed position to the opened position.

47. The vehicle structure according to claim 45, further comprising
a stay member coupled between the mounting structure and the side panel door to limit downward movement of the side panel door, with the stay member being located outside of the compartment and being completely covered by the side panel door when the side panel door is in the closed position.

48. The vehicle structure according to claim 45, further comprising
the side panel door includes a latching member and the compartment includes a latch member that is arranged to cooperate with the latching member of the side panel door to retain the side panel door in the closed position.

49. The vehicle structure according to claim 48, wherein the latching member includes a lock cylinder and a lock cylinder cover.

50. The vehicle structure according to claim 48, wherein the lock cylinder cover is arranged to pivot relative to the side panel door between a covering position overlying the lock cylinder and an uncovered position exposing the lock cylinder.

51. The vehicle structure according to claim 50, wherein the lock cylinder cover is biased to the covering position by a biasing element.

52. The vehicle structure according to claim 51, wherein the lock cylinder cover includes a sealing member that is configured and arranged to protect the lock cylinder from contaminates.

53. The vehicle structure according to claim 45, wherein the vehicle body further includes a floor panel supported by a lateral cross member with the mounting structure being fixedly coupled directly to the lateral cross member.

* * * * *